United States Patent [19]

Barton et al.

[11] Patent Number: 4,900,941
[45] Date of Patent: Feb. 13, 1990

[54] METHOD AND APPARATUS FOR VERIFYING INDICIA CORRECTLY PROVIDED ON AN OBJECT

[76] Inventors: Maya R. Barton, 336 Barrack Hill Rd., Ridgefield, Conn. 06877; Ronald P. Sansone, 4 Trails End Rd., Weston, Conn. 06883; Mark E. Sievel, 132 Walnut Hill Rd., Bethel, Conn. 06801

[21] Appl. No.: 98,581

[22] Filed: Sep. 18, 1987

[51] Int. Cl.$^4$ .............................................. G06K 7/10
[52] U.S. Cl. .................................... 250/566; 235/462
[58] Field of Search .................... 250/566, 568; 382/1; 209/584, 900; 235/462–466

[56] References Cited

U.S. PATENT DOCUMENTS

| | | | |
|---|---|---|---|
| 3,757,942 | 9/1973 | Gunn | 209/584 |
| 3,935,429 | 1/1976 | Branecky et al. | 209/900 |
| 4,034,341 | 7/1977 | Ison et al. | 382/1 |
| 4,158,835 | 6/1979 | Muira et al. | 209/900 |
| 4,347,936 | 9/1982 | Fasig | 209/900 |
| 4,607,137 | 8/1986 | Jansen | 178/22.14 |
| 4,608,629 | 8/1986 | Nagel | 364/200 |

Primary Examiner—David C. Nelms
Assistant Examiner—Khaled Shami

[57] ABSTRACT

A technique for verifying that indicia, such as print indicia, are provided at the correct location(s) on an object. Relative movement between the object and a sensor is provided. If sensed indicia are located at an expected position on the object, an indicia-bearing object is vertified. One or more samples of a proper object are scanned to establish a template which defines those locations at which indicia on the samples are located. This template is used subsequently to verify the presence of proper indicia-bearing objects.

31 Claims, 4 Drawing Sheets

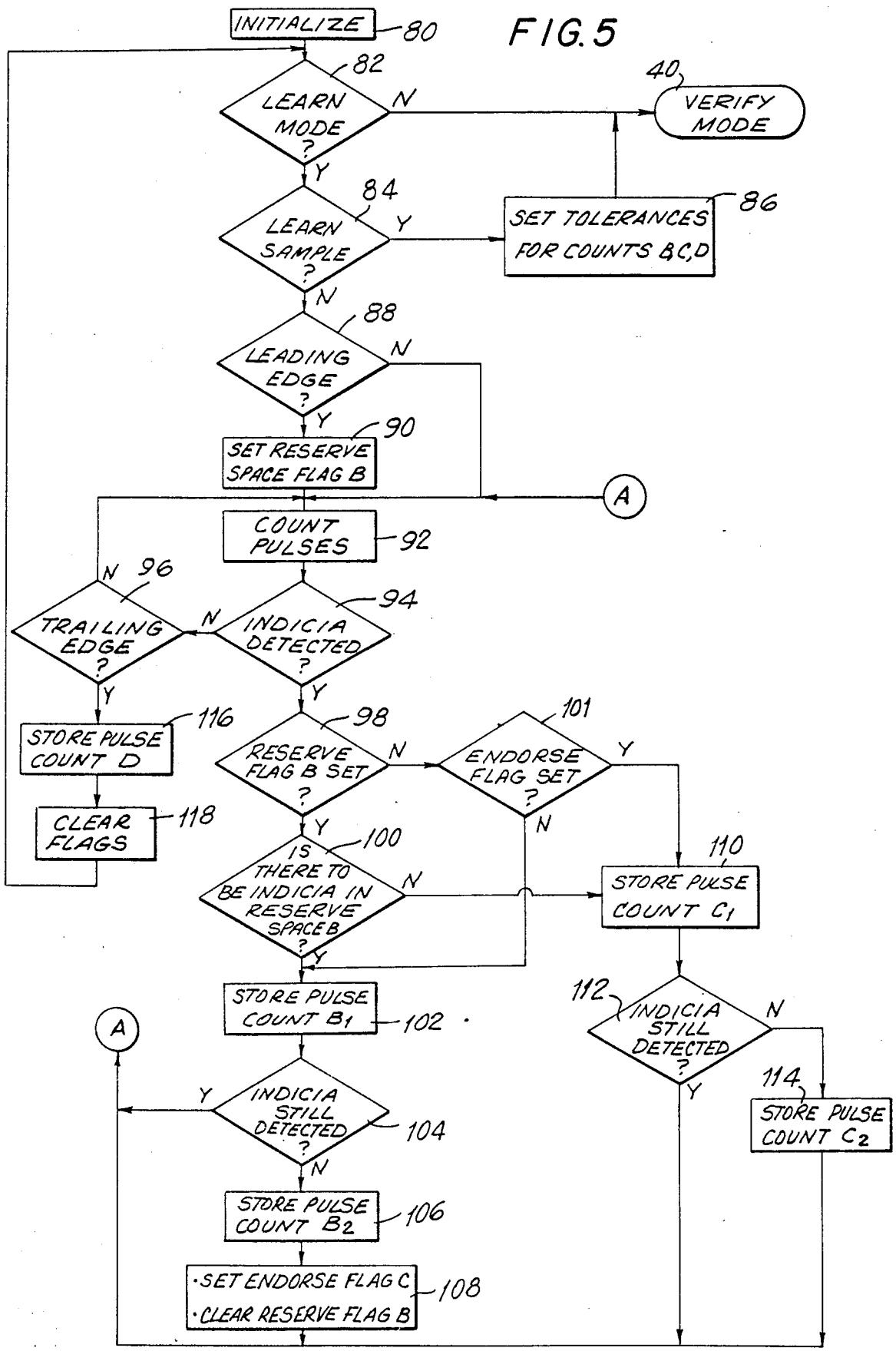

METHOD AND APPARATUS FOR VERIFYING INDICIA CORRECTLY PROVIDED ON AN OBJECT

BACKGROUND OF THE INVENTION

This invention relates to a method and apparatus for sensing indicia on an object and, more particularly, to sensing if indicia are present or absent at selected locations, or zones, on the object.

It often is necessary during high-speed automated processing and manipulation of various objects to verify that such automated processing is proceeding properly. In some applications, indicia are printed or otherwise provided on objects which subsequently are handled for various purposes. In the environment of automated mail handling systems, for example, pre-addressed envelopes may be conveyed and passed rapidly through a printer which operates to print various additional indicia on those envelopes. For instance, bar codes representing zip codes may be printed on the envelopes; these bar codes being sensed by postal service equipment for the rapid classification of mail by zip code destination. Other indicia also may be printed on the envelopes for the purpose of providing sorting of mailing pieces, postage discounts and record keeping, all associated with rapid processing of large volumes of mail.

In the aforementioned environment, indicia are printed at various select locations on the envelope by high-speed mail-handling equipment. To assure the correct operation of such equipment, it is important to verify that indicia are, in fact, printed at those selected locations. Indeed, it may be as important to verify the presence of indicia as to interpret that indicia.

A desirable feature of automated mail-handling equipment is to permit the utilization thereof by individuals who need not necessarily possess high technical skills. Advantageously, indicia verifying equipment of the aforementioned type should be adaptable to accommodate envelopes of various sizes and shapes, and should be further adaptable for use with different sets of envelopes wherein one set may be provided with indicia at one location thereon while, in another set, that same location may be provided with no indicia.

The problems associated with automated mail-handling equipment also may be found with other high-speed equipment which manipulate other types of objects, such as printed documents, coded containers, marked assembly parts, tagged baggage and the like. A common difficulty in all of these is that, in the absence of indicia located at correct, predetermined position on an object, significant economic effects may result. Typically, object-handling apparatus, such as conveyor belts, transport equipment and other associated devices, may have to be shut down to isolate the cause of failure to provide such indicia. A more serious disadvantage may result in an entire run of envelopes, documents, containers or other manipulated objects being rejected or disqualified because of the absence of indicia at the correct locations. It will be appreciated that it is highly inefficient and expensive to initiate another run or to substitute for the disqualified or rejected objects.

It has become acceptable in automated mail-handling equipment to provide then Postal Service with a manifest of mail pieces (e.g. envelopes) which summarizes the number of pieces directed to specific zip code destinations, and to bundle such pieces to facilitate further processing by the Postal Service. To correlate such mail pieces with the manifest, informational indicia and, in many instances, coded indicia (such as bar codes) are provided on each envelope. In return for the marking of these mail pieces and for the manifest therefor, the Postal Service grants discounts in the established postage rates to those who comply with the particular regulations associated with this discounted service. However, in the absence of the agreed upon indicia on the mail pieces, users may forfeit the discounts to which they otherwise might be entitled, and may even be subject to various monetary penalties.

Thus, there is a need to provide a system by which objects in general, and mail pieces in particular, may be verified as having indicia provided at the correct locations thereon. Additionally, and with specific reference to automated mail-handling equipment and other high-speed document handling devices, there is an added benefit if the system which verifies the presence of indicia on an object also functions to anticipate possible jams which may develop in the handling equipment. For example, if successive envelopes or documents overlap, not only will indicia not be sensed on the underlying envelope (or document), but the overlap may cause a jam or other misoperation in the mail-handling (or document-handling) equipment.

OBJECTS OF THE INVENTION

Therefore, it is an object of the present invention to provide a method and apparatus which avoids the disadvantages and errors associated with automated object-handling equipment of the type used heretofore.

Another object of this invention is to verify the presence of indicia at correct locations on an object.

A further object of this invention is to provide a system that is adaptable for use with objects (for example, envelopes) of differing sizes and shapes on which indicia may or may not be printed at different locations or zones.

An additional object of this invention is to provide a method and apparatus for "learning" the locations of particular zones on a sample of an object and also "learning" whether indicia are provided at the respective zones; and then verifying the presence of such indicia at the proper zones on actual (or working) objects.

Yet another object of this invention is to provide a system of the aforementioned type which additionally detects whether adjacent objects (such as envelopes or documents) overlap.

Various other objects, advantages and features of the present invention will become readily apparent from the ensuing detailed description, and the novel features will be particularly pointed out in the appended claims.

OF THE INVENTION

In accordance with this invention, the presence of indicia correctly provided on an object is verified by providing relative movement between the object and a sensor, determining the location on the object at which indicia are expected and then sensing whether indicia are present at that location. As one feature of this invention, the leading edge of the object is detected, and one or more locations at which indicia are expected are measured from that leading edge. As an aspect of this feature, pulses are generated as relative movement between the object and the sensor is provided, these pulses are counted and particular locations, or zones, are represented by respective pulse counts.

As another feature of this invention, if indicia are not expected in a particular zone, but indicia are sensed, an error indication is provided. Alternatively, if a zone in which indicia are expected is not provided with indicia, an error indication is produced.

Preferably, indicia are sensed by optically scanning the object. A signal is produced whose level changes as a function of the light intensity sensed by the optical sensor. The presence of indicia is determined by detecting whether the average signal level changes over a period of time exceed a threshold level.

As another feature of this invention, the leading and trailing edges of the object are detected, and the number of pulses generated between the leading and trailing edges are compared to an approximate pulse count which represents the length of the object. If the trailing edge has not been detected by the time the actual pulse count exceeds the approximate pulse count, an error indication is provided, representing the likelihood that successive objects overlap.

As yet another feature, this invention may be used to verify the presence of indicia at different zones on objects of various sizes and shapes. For example, indicia at different zones on envelopes of different sizes may be verified. The system which is used to carry out the present invention may be operated initially in a "learning" mode to scan a relatively small number of samples on which indicia are provided. During the "learning" mode, the locations of such indicia are sensed to establish zones in which indicia are expected. Based upon the "learning" mode, or set-up procedure, the system subsequently is operated in its "verifying" mode to sense whether indicia are provided on objects in the proper zones. If indicia are sensed outside these zones; or if indicia are not sensed in the "learned" zones, error indications are provided. During the "learning" mode, the actual length of the object also is determined.

As one aspect of this feature, pulse counts which define the beginning and ending of the respective zones are stored. Tolerances are established at the boundaries of the respective zones to accommodate irregularities or non-uniformities that might be present in or on the objects which subsequently are verified. For example, the pulse count which represents the beginning and/or ending of a zone may be decreased or increased by n pulses (wherein n= a predetermined number) to establish such tolerances.

BRIEF DESCRIPTION OF THE DRAWINGS

The following detailed description, given by way of example, will best be understood in conjunction with the accompanying drawings in which:

FIG. 5 is a flow chart illustrating the manner in which the present invention "learns" where to expect indicia on an object that is verified by this invention.

DETAILED DESCRIPTION OF A PREFERRED EMBODIMENT

Figure 1:
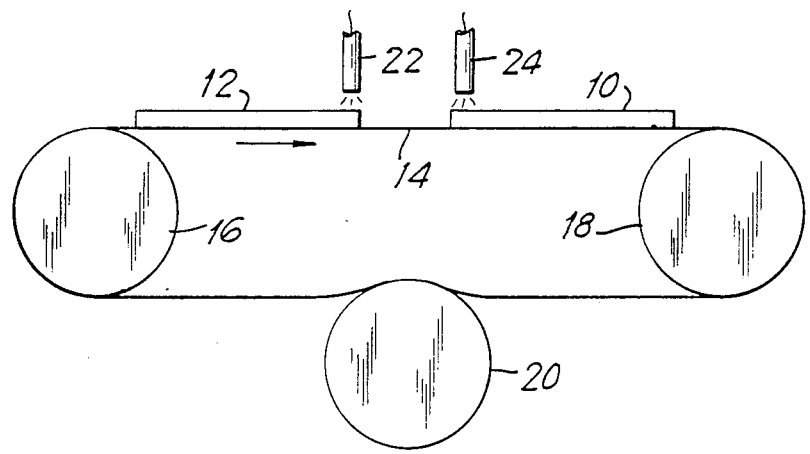
FIG. 1 is a schematic representation of a system which includes the present invention.

Referring now to the drawings, FIG. 1 is a schematic representation of apparatus with which the present invention finds ready application. For convenience and simplification, the present invention will be described in the environment of mail-handling equipment. Specifically, the present invention, as described herein, is used to verify printed indicia provided on particular locations, or zones, of envelopes. Notwithstanding this particular description, it will be readily apparent to those of ordinary skill in the art that this invention can be used to verify indicia provided at proper locations on other objects, such as documents (e.g. forms which are generated by other apparatus or forms which are pre-printed and to which additional information is added), containers (e.g. beverage cans that are marked with particular codes to identify the product, date of manufacture, date of processing, place of manufacture, destination, etc.), machine parts, assembly components, baggage, and virtually any other object on which indicia may be provided at selected locations.

In the environment of mail-handling equipment, the apparatus illustrated in FIG. 1 is adapted to transport a series of envelopes, such as envelopes 10, 12, etc., past a sensing station whereat indicia provided at proper locations on each envelope are verified. The envelopes are supplied from further apparatus (not shown) located upstream of the equipment illustrated in FIG. 1; and when supplied, envelopes 10 and 12 are transported by means of a transport mechanism 14, such as an endless conveyor belt or other conventional conveying apparatus.

In the embodiment of a conveyor belt, endless belt 14 is deployed about drive wheels 16 and 18 which are driven by suitable means (not shown) to advance the endless belt in the direction illustrated by the arrow. Suitable hold-down means (not shown) retains envelopes 10 and 12 on belt 14 such that these envelopes move as the belt is driven by drive wheels 16 and 18. An encoder 20 is mechanically coupled to the illustrated transport mechanism and is adapted to generate a series of pulses as the endless belt is driven. A suitable encoder wheel, also known as a chopper wheel, or other conventional apparatus may be used to generate these pulses by modulating a suitable sensor (not shown). It is appreciated that the pulses generated by encoder 20 exhibit a timed relationship as the endless belt (and, thus, as each envelope) moves. Hence, a count of these pulses may be used as a measure of the distance a particular envelope moves past a sensor.

Envelopes 10 and 12 (as well as other envelopes, not shown) are transported by transport mechanism 14 past one or more fixed sensors 22 and 24. In one embodiment, sensors 22 and 24 are formed as optical sensors for the purpose of sensing the presence of an envelope transported thereto and also to sense the presence or absence of indicia printed on the envelope. In the embodiment shown in FIG. 1, two optical sensing devices are shown, wherein photo sensor 22 operates to detect the leading edge of an envelope (and, if desired, the trailing edge) and photoelectric detector 24, spaced from photo sensor 22 by a fixed, known distance, senses the presence (or absence) of indicia on an envelope transported therebeneath. Photoelectric detector 24 is provided with suitable electronics to produce a signal whose level changes as a function of the light intensity reflected to and picked up by the detector. As one embodiment, photoelectric detector 24 may be formed as a C40000 Series Square Skamps scanner/amplifier, manufactured by Skan-A-Matic Corporation. Of course, other suitable photoelectric detectors may be used in place of the Skan-A-Matic device. Photoelectric detector 24 may be adapted to scan the equivalent of a single line of printed indicia on an envelope or, alternatively, the detecting fluid of the photoelectric detector may be large enough to sense printed indicia disposed in two lines. Still further, the photoelectric detector may be capable of scanning in the vertical direction, relative to the horizontal passage of an envelope therebeneath, to detect the presence of printed indicia in two separate lines. Still further, two or more photoelectric detectors may be provided, one for each expected horizontal line of print indicia.

In the embodiment shown in FIG. 1, two separate optical detecting devices 22 and 24 are provided, one to detect the presence and, additionally, the leading edge (and, if desired, the trailing edge) of an envelope, and the other to detect the presence of indicia on the envelope. If desired, these different functions may be carried out by a single optical detecting device, such as photoelectric detector 24.

Also, although the embodiment shown in FIG. 1 contemplates the transport of envelopes 10 and 12 past one or more fixed optical detecting devices, the present invention may be used by moving the optical detecting device(s) past fixed envelopes. Of course, for high-speed mail handling applications, it is preferred that individual pieces of mail (i.e. envelopes) be transported past one or more fixed optical detecting devices. As used herein, the expression "relative movement" is intended to mean either movement of the envelopes past fixed optical detecting devices or movement of optical detecting devices past fixed envelopes.

As a further modification of the embodiment illustrated in FIG. 1, it is contemplated that sensing devices other than an optical detector may be used to sense the presence and/or leading and/or trailing edge of an envelope. For example, a mechanical element, such as a wiper, may be used to detect the leading edge of an envelope. Other devices, such as those which detect a change in electrical properties (e.g. capacitance) due to the presence of a paper envelope, also may be used.

Figure 2:
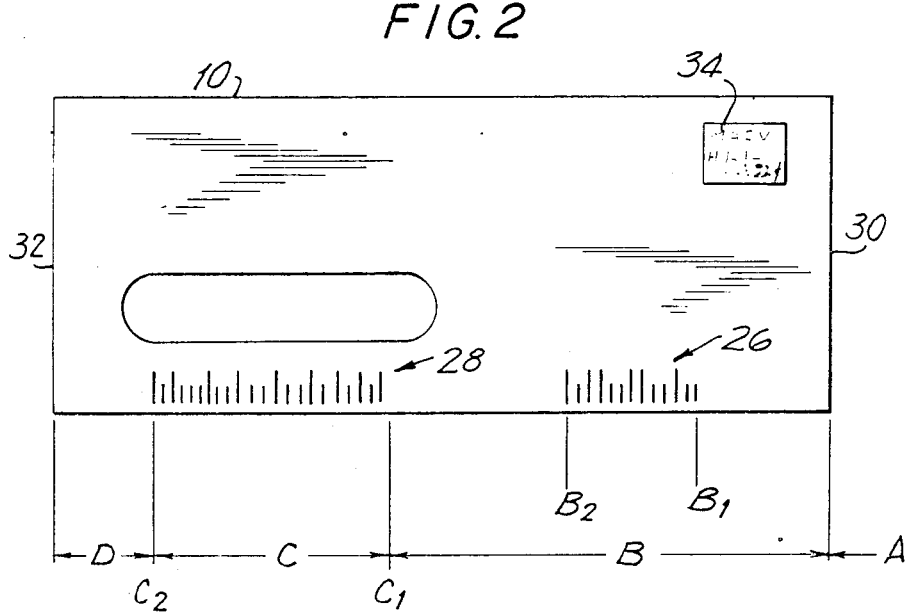
FIG. 2 is an illustration of indicia which are verified by the present invention as being provided at respective locations, or zones, of an envelope.

To better appreciate the use of the present invention to verify indicia at correct locations on a proper envelope, one example of such an envelope is illustrated in FIG. 2. Envelope 10 is provided with a leading edge 30 and a trailing edge 32. Located in the vicinity of the lower longitudinal edge of the envelope are particular zones which, for convenience, are identified as follows: Zone B, referred to commonly as a "reserved space" in which indicia 26 may or may not be provided; Zone C, commonly referred to as an "endorsement space" in which indicia 28 may or may not be provided; and Zone D, commonly referred to as a "trailing space" in which indicia normally are not provided. In addition, the space which normally separates successive envelopes 10 and 12 (FIG. 1) is identified as Zone A, referred to merely as "between envelopes" space. As envelopes are transported past photoelectric detector 24, the photoelectric detector senses Zone A, followed by leading edge 30, followed by Zone B, followed by Zone C, followed by Zone D, followed by trailing edge 32, followed by Zone A, and so on.

In a typical embodiment, indicia 26 are comprised of conventional bar codes which, for example, may identify the zip code destination to which envelope 10 is to be mailed. Of course, other information may be used as indicia 26, including human-readable data. It is expected that, in a "batch" of envelopes processed during one run with the present invention, all of the envelopes included in that batch will be of the same size and shape; indicia 26 will be of uniform length, and it is expected that the indicia will be provided in substantially the same location in Zone B for all of the envelopes in this batch. Of course, for another batch of envelopes, the size and shape of each envelope in that batch may differ from the envelopes included in a preceding batch, indicia 26 may be omitted in that subsequent batch, or the length of the indicia may vary from that of the preceding batch, and the particular location of indicia 26 in Zone B likewise may vary. This will be described in greater detail below.

Indicia 28 may be comprised of alphanumeric information, such as mail sort categories which are used in conjunction with postage discounts provided by the Postal Service, or other information that, typically, is printed on envelopes mailed by high volume users. Indicia 28 may be disposed along a single horizontal line or, alternatively, may be present in two (or even more) lines. In one batch of envelopes, indicia 28 generally are provided at the same location within Zone C for all envelopes. In one embodiment, the beginning of indicia 28 corresponds with the beginning of Zone C and the end of indicia 28 corresponds with the end of Zone C. Alternatively, the indicia may be disposed within and spaced from the beginning and ending boundaries of Zone C. Indicia 28 normally are provided on envelope 10, although the present invention may be used in applications wherein Zone C is expected to be free of indicia.

Although the present invention also may be used to detect the presence of indicia positioned at any other location on envelope 10, for example, to verify the existence of metered indicia 34, a brief description of the manner in which indicia 26 and 28 are verified as being located in Zones B and C now is provided.

Let it be assumed that envelope 10 is transported by transport mechanism 14 past photo sensor 22 and photoelectric detector 24. In the presently described example, photo sensor 22 is used merely to sense the presence of an envelope. If an envelope is not sensed by the photo sensor, an error indication is provided and, if desired, the mail-handling equipment may be halted. It is further assumed that photoelectric detector 24 detects leading edge 30, indicia 26, indicia 28 and trailing edge 32. Of course, and as mentioned above, the leading and trailing edges of envelope 10 may be sensed by photo sensor 22.

Figure 3A:
FIGS. 3A-3E are timing diagrams and waveforms which are useful in understanding the present invention.

Referring to FIGS. 3A-3E, as envelope 10 is transported, a series of pulses (referred to for convenience as "encoder pulses") is generated by encoder 20. As a numerical example, the speed and dimensions of the transport mechanism may be such that approximately 62.3 encoder pulses are generated for each inch of movement of an envelope. These encoder pulses are illustrated in FIG. 3A.

Figure 3B:
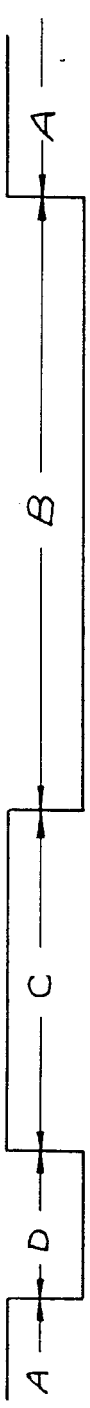

Upon sensing leading edge 30 of envelope 10, a significant change in light intensity is sensed by photoelectric detector 24, resulting in, for example, a negative-going change in the signal level produced by the photoelectric detector. This negative-going change is illustrated in FIG. 3B and represents the end of Zone A (i.e. the space between successive envelopes), and the beginning of Zone B Photoelectric detector 24 senses whether indicia are present in Zone B.

Figure 3C:
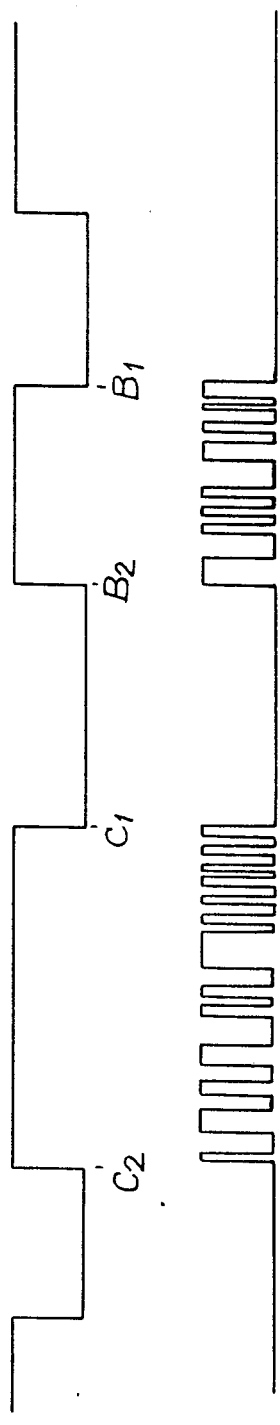
Figure 3D:

Upon sensing the beginning of indicia 26 at location $B_1$ in Zone B, photoelectric detector 24 produces a positive-going change in the signal level produced thereby at location $B_1$, as illustrated in FIG. 3C. It is expected that the signal level produced by the photoelectric detector undergoes a number of level changes corresponding to the changes in light intensity resulting from indicia 26. These signal level changes extend from the beginning of indicia 26, at location $B_1$, to the end of the indicia at location $B_2$. FIG. 3D is a simplified representation of such signal level changes.

Figure 3E:

To distinguish between indicia 26 and extraneous noise which may be produced by, for example, dirt, dust, smudges and the like, the signal level changes shown in FIG. 3D may be integrated over a period of time to produce a relatively slowly varying signal, and this slowly varying signal may be compared to a threshold level. The integrated signal may be thought of as the time-average of the photoelectric detector signal level changes, and this is illustrated by the waveform of FIG. 3E. If the time-average signal exceeds threshold level L, indicia are verified. Of course, if indicia 26 are not present, the transitions at $B_1$ and $B_2$ in FIG. 3C, the signal level changes in the interval $B_1$-$B_2$ in FIG. 3D, and the time-average signal in interval $B_1$-$B_2$ in FIG. 3E will not be produced.

When envelope 10 is advanced to the beginning of indicia 28, photoelectric detector 24 senses a change in the intensity of light impinging thereon due to the presence of the indicia. This level change in light intensity produces a change in the level of the signal produced by the photoelectric detector, as represented by the positive transition at the boundary between Zones B and C in FIG. 3B. FIG. 3C also illustrates this positive-going transition at location $C_1$. As the envelope continues to move beneath photoelectric detector 24, indicia 28 produce the changes in signal level illustrated in FIG. 3D. It is appreciated that this change in signal level extends from location $C_1$ to location $C_2$, and in this example the interval $C_1$-$C_2$ corresponds to Zone C. As before, if the time-average of this changing signal level shown in FIG. 3D is produced, the resultant signal exhibits a relatively slowly changing amplitude, as shown in FIG. 3E. This slowly changing amplitude is compared to threshold L to provide an indication of the presence of indicia when the threshold is exceeded.

At the end of indicia 28 (location $C_2$), the signal produced by photoelectric detector 24 undergoes a negative transition, as represented by the waveforms shown in FIGS. 3B and 3C. Then, upon detecting trailing edge 32, the signal produced by the photoelectric detector undergoes a positive transition which establishes the boundary from Zone D to Zone A. The photoelectric detector now senses the space between successive envelopes; and upon detecting the leading edge of the next-following envelope, the signal produced by the photoelectric detector undergoes the changes represented by the waveforms of FIGS. 3B-3E once again.

It is appreciated that the pulses which are generated as envelope 10 is transported (i.e. the pulses shown in FIG. 3A may be counted as the envelope is moved relative to photoelectric detector 24. The pulse count which is obtained at the transition from Zone A to Zone B, that is, the pulse count which is produced when leading edge 30 is detected, may be stored to establish the beginning of Zone B. Likewise, the pulse count which is obtained at the transition from Zone B to Zone C, that is, when indicia 28 are detected, may be stored. The difference between these pulse counts represents the interval of Zone B. If the presence of indicia is not detected during this interval, that is, if the transitions at locations $B_1$ and $B_2$ (FIG. 3C) are not produced, or if the signal level changes in this interval $B_1$-$B_2$ as shown in FIG. 3D are not sensed, or if the time-average signal produced during this interval $B_1$-$B_2$ (FIG. 3E) is not produced, then it is concluded that indicia are not present in Zone B. If indicia are not expected in this zone (as will be described below), then no error indication is provided. However, if it is anticipated that indicia 26 should be present, then the absence of sensing such indicia in Zone B results in an error indication.

Similarly, the pulse counts obtained at the beginning and end of Zone C, that is, the pulse counts at locations $C_1$ and $C_2$ may be stored. If indicia are expected within this zone, an error indication is provided in the event that indicia are not sensed during the interval between these pulse counts. Conversely, if indicia are sensed between the time that the pulse count changes from that corresponding to location $C_1$ to that corresponding to location $C_2$, no error indication is provided. However, if indicia are not expected in the interval between these pulse counts, the presence of indicia will result in an error indication.

For an envelope of predetermined size, it is expected that Zone D will be of a predetermined length. It is appreciated that this length is determined as a function of the pulse count which is obtained at the transition between Zone C and Zone D to the pulse count which is obtained when trailing edge 32 is detected. However, if the pulse count continues to increment so as to exceed a predetermined amount prior to the detection of a trailing edge, an error indication may be provided. Such excessive pulse counts may be caused by, for example, an overlap of successive envelopes, thereby impeding the ability of photoelectric detector 24 to detect trailing edge 32. Such an overlap gives rise to a potential jam in the mail-handling equipment; and it is preferred that an error indication thereof be provided to allow corrective action to be taken to avoid such a jam.

Additionally, if indicia are not expected in Zone D, an error indication may be provided if the signal produced by photoelectric detector 24 undergoes level changes attributed to indicia after the pulse count corresponding to the transition from Zone C to Zone D is obtained.

As will be described below, the pulse counts corresponding to the transitions from Zone B to Zone C, from Zone C to Zone D and from Zone D to Zone A may be preset so as to establish the lengths and locations of these respective zones. For example, Zone B may be defined by a predetermined count (referred to as Count B) which is accumulated from the time that leading edge 30 is detected to the time that indicia 28 are detected. Zone C may be defined by another count (referred to as Count C) which is accumulated from the time that leading edge 30 is detected to the time that the end of indicia 28 are detected. Likewise, Zone D may be defined by the count which is accumulated (referred to as Count D) from the time that the leading edge is detected to the time that trailing edge 32 is detected. Thus, the presence of indicia in Zone B is determined by sensing if indicia are present prior to the time that Count B has been accumulated. Likewise, the presence of indicia 28 is determined by sensing if indicia are detected between Counts B and C. Finally, the presence of indicia in Zone D is determined by sensing indicia between Counts C and D. An overlap is determined if Count D has been reached prior to detecting the presence of trailing edge 32. Of course, to accommodate zones of different sizes, Counts B, C and D may be adjusted accordingly.

In the preferred embodiment, the signals produced by photo sensor 22, photoelectric detector 24 and encoder 20 are supplied to a data processing device, or to a suitably programmed microprocessor, such as an Intel Model 8088, or the like. The manner in which a microprocessor operates to sense whether indicia are provided at proper locations on an envelope 10 now will be described in conjunction with the flow chart illustrated in FIG. 4. For the purpose of the present discussion, it will be assumed that counts corresponding to counts B, C and D have been determined and stored previously, thereby establishing the locations and sizes of Zones B, C and D, respectively.

Figure 4:
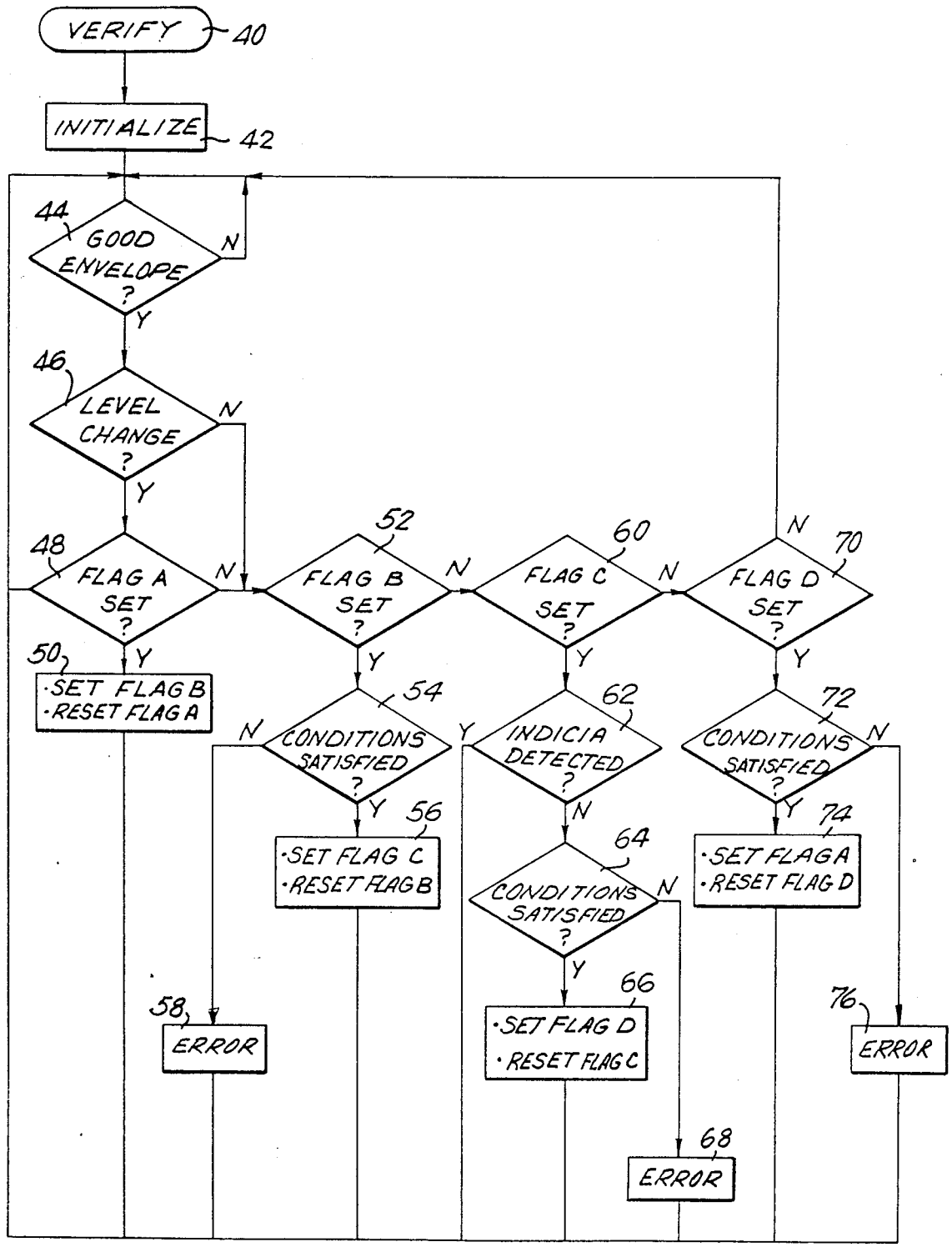
FIG. 4 is a flow chart representing the manner in which the present invention operates to verify indicia that are correctly provided on a proper object.

The routine illustrated in FIG. 4 is referred to as the verify routine 40; and this routine commences by carrying out an initialize subroutine 42, as is conventional to those of ordinary skill in the microprocessor art. Following the initialize subroutine, inquiry is made at 44 to determine if a proper envelope has been transported to the optical detectors. For purposes of simplification, inquiry 44 is answered in the affirmative if the presence of an envelope is detected and is answered in the negative if an envelope is not detected. In the absence of an envelope on transport mechanism 14, the illustrated routine simply cycles through this inquiry.

When inquiry 44 is answered in the affirmative, that is, if an envelope is detected, inquiry 46 is made to determine if the signal produced by photo sensor 22 or by photoelectric detector 24 undergoes a change in level. It is appreciated that this inquiry is answered in the affirmative upon detecting a leading edge or a trailing edge; or upon detecting the beginning of indicia and the end of indicia.

Let it be assumed that leading edge 30 is sensed and, thus, inquiry 46 is answered in the affirmative. The routine then advances to inquire at 48 if, prior to producing this level change, the space between successive envelopes had been opposite photoelectric detector 24. As will be described below, after trailing edge 32 of a preceding envelope is detected, a flag (referred to as flag A) is set indicating that the photoelectric detector is positioned between the trailing edge of one envelope and the leading edge of the next-following envelope. That is, flag A is set to indicate that the photoelectric detector is between successive envelopes.

If flag A is set, inquiry 48 is answered in the affirmative and the verify routine advances to instruction 50 whereat flag B, a "reserve space" flag, is set. This flag indicates that the beginning of Zone B has been reached. The routine then returns to inquiry 44 to repeat the aforedescribed operations.

If inquiry 48 is answered in the negative, that is, if flag A had not been set at the time that a signal level change is produced, or if no signal level change is produced (inquiry 46 is answered in the negative), the verify routine advances to inquiry 52 to determine if flag B, the "reserve space" flag had been set. If flag B had not been set, the routine advances to inquiry 60 to determine if flag C, an "endorse space" flag, had been set. As will be described, flag C is set if expected indicia are sensed in Zone B or, alternatively, as expected, no indicia are sensed in Zone B. If inquiry 60 is answered in the negative, that is, if flag C (the "endorse space" flag) had not been set, the routine advances to inquiry 70 to determine if flag D, the "trailing space" flag, had been set. As will be described, flag D is set if Zone C, as expected, contains or does not contain indicia. If inquiry 70 is answered in the negative (e.g. flag A is set but a level change is not detected), the verify routine returns to inquiry 44.

Let it be assumed that inquiry 48 had been answered in the affirmative. As a result, flag B (the "reserve space" flag) is set and flag A is reset. Accordingly, the verify routine now awaits the satisfaction of pre-established conditions, as determined by inquiry 54. Let it be assumed that the beginning of indicia 26 are sensed (and the pulse count has accumulated to a count of $B_1$). At that time, the signal produced by photoelectric detector 24 undergoes level changes of the type illustrated in FIG. 3D in response to sensed indicia. Inquiry 54 determines if the pre-established conditions associated with Zone B have been satisfied.

If one of these pre-established conditions is that indicia are expected in Zone B, but if a sufficient number of level changes caused by indicia are not produced, that is, if the slowly varying signal produced in response to the level changes from photoelectric detector 24 does not exceed threshold L, inquiry 54 is answered in the negative and an error indication 58 is provided As an alternative, if indicia are not expected in Zone B, but the slowly varying signal produced in response to the level changes from the photoelectric detector exceeds threshold L, thus indicating the presence of indicia, inquiry 54 is answered in the negative and error indication 58 is provided. Thus, depending upon the previously established conditions concerning the presence or absence of indicia in Zone B, inquiry 54 is answered in the negative if these pre-established conditions are not satisfied. However, if indicia are expected in Zone B and indicia are sensed, or if indicia are not expected and are not sensed, inquiry 54 is answered in the affirmative. It is appreciated that this inquiry is answered in the affirmative at or prior to the time that the count of encoder pulses has been incremented to count $C_1$. If indicia have not been sensed by the time the pulse count reaches count $C_1$, it is concluded that indicia are not present in Zone B.

An affirmative answer to inquiry 54 results in the setting of flag C, the "endorse space" flag, thus indicating that the beginning of Zone C has been reached. Flag B is reset, the verify routine now returns to inquiry 44 which, of course, is answered in the affirmative; and the routine advances through inquiries 46, 52 and 60 to await the sensing of indicia in Zone C by photoelectric detector 24. Inquiry 62 determines if indicia are detected. As mentioned above, if the time average of level changes produced by photoelectric detector 24 exceeds threshold level L, it is concluded that indicia have been sensed by the detector. Of course, other techniques may be used to discriminate between sensed indicia and other perturbations that might be caused by, for example, noise, dirt, and the like. If inquiry 62 is answered in the affirmative, the verify routine cycles through the loop formed of inquiries 44, 46, 52, 60 and 62 until indicia no longer are sensed by the photoelectric detector. At that time, inquiry 62 is answered in the negative and the routine advances to inquire, at 64, if pre-established conditions have been satisfied. An example of such pre-established conditions include the sensing of indicia in Zone C (i.e. from the time that the pulse count reaches count $C_1$ to the time that the pulse count reaches count $C_2$). Another example may be the duration (e.g. the number of pulses that are counted) over which the indicia extend. Yet another example might be the absence of indicia in Zone C (that is, verification might depend upon the exclusion of indicia in this zone). In any event, inquiry 64 determines if the foregoing (as well as other) pre-established conditions have been satisfied. If this inquiry is answered in the negative, that is, if indicia are expected but not sensed; or if indicia are not expected but are sensed; or if the duration (or interval) of sensed indicia is insufficient, an error indication 68 is provided. However, if the pre-established conditions are satisfied, inquiry 64 is answered in the affirmative and flag D, a "trailing space" flag, is set, thus indicating that Zone D has been reached. Flag C is reset and the verify routine then returns to inquiry 44.

The routine then cycles through inquiries 44, 52, 60 and 70 to await the satisfaction of pre-established conditions in Zone D. Let it be assumed that trailing edge 32 is sensed, thus representing the end of Zone D and the beginning of Zone A (the "between envelopes" space). FIGS. 3B and 3C illustrate this signal level change at the boundary between Zones D and A. The verify routine advances to inquiry 72 to determine if pre-established conditions had been satisfied. For example, if the pulse count is incremented to a predetermined count well beyond that which is expected at the time that leading edge 32 should be detected, inquiry 72 is answered in the negative. Similarly, if indicia are not expected in Zone D but are sensed in this interval, inquiry 72 is answered in the negative. Other pre-established conditions similar to those mentioned above likewise should be satisfied. If such conditions are not satisfied, inquiry 72 is answered in the negative and an error indication 76 is provided. However, if the pre-established conditions are satisfied, inquiry 72 is answered in the affirmative and flag A, the "between envelopes" flag, is set, while flag D is reset. The verify routine thus awaits the next envelope to verify that indicia are present at Zone B and/or Zone C.

In the foregoing, a level change may be produced by photo sensor 22 and/or by photoelectric detector 24. This level change may be in response to a detected leading or trailing edge, or it may also be in response to detected indicia. The example discussed above has assumed, merely for simplification, that a level change is produced (inquiry 46 is answered in the affirmative) when a leading or trailing edge is detected. In this regard, it has been assumed that a "level change" differs from signal level changes which are caused by the detection of indicia.

The manner in which the aforementioned pre-established conditions are set to determine whether indicia should or should not be expected in a particular zone, or whether the trailing edge of an envelope has been properly detected, now will be described with reference to the "learning routine" illustrated in FIG. 5.

The "learning routine" is executed when one, and preferably a small number (e. g. two or three) of samples of an envelope of desired size, having indicia provided at proper locations, is transported pas the optical detecting devices illustrated in FIG. 1. The purpose of the learning routine is to measure the overall length of the sample envelope from leading edge 30 to trailing edge 32, the length of each of Zones B, C and D, and to determine whether indicia are present in Zone B and in Zone C. As an advantageous feature, the particular location of indicia in a zone, such as in Zone B, also is determined. These characteristics (size of the envelope, size of each zone, presence or absence of indicia in each zone and location of indicia in at least one zone) are examples of the pre-established conditions which have been discussed above in conjunction with the flow chart of FIG. 4.

Turning now to FIG. 5, the learning routine commences with an initialize subroutine 80, known to those of ordinary skill in the art, following which inquiry is made at 82 as to whether the system is operating in its learning mode or in its verifying mode. If inquiry 82 is answered in the negative, the routine advances to the verify routine, discussed above. However, if the system is operating in its learning mode, inquiry 82 is answered in the affirmative and the learning routine advances to inquire, at 84, if the envelope (or, more generally, any other sample object) which is being transported is the last sample to be examined. If this inquiry is answered in the affirmative, predetermined tolerances for pulse counts B, C and D (the pulse counts that define the ends of Zones B, C and D, respectively) are established. It is appreciated that counts B, C and D represent the counts at which Zone B ends, Zone C ends and Zone D ends, respectively, as shown in FIG. 2. The manner in which these counts are obtained will be discussed below.

The predetermined tolerances which are established for these counts take into consideration the possibility that actual envelopes included in a batch to be verified might differ in minor respects from the samples which have been examined. To account for these relatively minor differences, a range of counts is used to measure a zone. For example, let it be assumed that Zone B of a sample extends for 290 pulse counts. During a verification operation, Zone B might be measured to extend for approximately 292 counts. To accommodate this, a tolerance of 2 counts is added to the actual count that has been measured from the sample.

As another example, let it be assumed that indicia 26 is expected between counts 100 and 250, and indicia 28 are expected between counts 295 and 405, as sensed on a sample envelope. During an actual verifying mode of operation, indicia 26 will be sensed as being correctly positioned if they occur between pulse counts 98 and 252. Likewise, indicia 28 will be sensed as being correctly positioned if they occur between pulse counts 293 and 407. Here too, a tolerance of 2 counts is added to the stored pulse counts which define the interval in which indicia are expected. Instruction 86 functions to enlarge the pulse counts B, C and D to accommodate such tolerances.

If inquiry 84 is answered in the negative, that is, if the sample which previously was examined was not the last sample to be examined in the "learning mode", the learning routine advances to inquire, at 88, if the leading edge of this sample is detected. If it is, a "reserve space" flag (flag B) is set, and encoder pulses which are generated as the sample moves past the optical detectors are counted, at 92. If the leading edge of the sample is not detected, inquiry 88 is answered in the negative, and the learning routine advances to instruction 92, whereat the encoder pulses are counted, without setting flag B.

After counting encoder pulses, inquiry is made at 94 as to whether indicia are detected on the envelope. If not, the learning routine advances to inquire, at 96, if the trailing edge of the sample has been detected. In this regard, photo sensor 22 may be used merely to sense leading and trailing edges of a sample envelope, and photoelectric detector 24 may be used merely to sense indicia. If indicia are not detected and if the trailing edge also is not detected, the learning routine cycles through the loop formed of instruction 92 and inquiries 94 and 96.

Let it be assumed that indicia are detected on the sample, resulting in an affirmative answer to inquiry 94. The learning routine then advances to inquiry 98 to determine if the "reserve" flag (flag B) has been set. It is recalled that, if the leading edge of the sample had been detected, flag B had been set and, thus, inquiry 98 now is answered in the affirmative. The routine advances to inquiry 100 to determine if indicia should be expected in the "reserve space" (Zone B). Suitable operator-activated switches may be used to establish this condition. If inquiry 100 is answered in the affirmative, that is, if indicia are expected in Zone B, then the pulse count which has been reached at this time is stored as pulse count $B_1$, as represented by instruction 102. It is recognized that, at the time instruction 102 is reached, the "reserve space" flag B had been set, thus indicating that Zone B had been reached, and indicia also had been detected (inquiry 94). From FIG. 2, it is seen that indicia in Zone B commences at pulse count $B_1$. This pulse count represents the location at which indicia 26 begins.

After storing pulse count $B_1$, the learning routine advances to inquire, at 104, if indicia still are detected. If this inquiry is answered in the affirmative, the routine returns to instruction 92, and cycles through the loop formed of instruction 92, inquiries 94, 98 and 100, instruction 102 and inquiry 104. Eventually, inquiry 104 is answered in the negative. For the purpose of the present discussion, it will be assumed that inquiry 104 will be answered in the negative before inquiry 94 is so answered. That is, a conclusion that indicia no longer are detected is reached before a conclusion that indicia are not detected is reached. If desired, a relatively small time delay may be imparted to inquiry 94.

When inquiry 104 is answered in the negative, the pulse count which then has been reached is stored as pulse count $B_2$, as represented by instruction 106. From FIG. 2, it is seen that indicia in Zone B no longer are detected at location $B_2$. Hence, pulse count $B_2$ represents that point in Zone B at which indicia 26 end. Then, instruction 108 is carried out to set the "endorse" flag C and to clear the "reserve" flag B. The learning routine then returns to instruction 92.

Following the location corresponding to pulse count $B_2$, it is seen that indicia are not provided. Hence, when the learning routine advances to inquiry 94, this inquiry is answered in the negative. Since the trailing edge has not yet been reached, inquiry 96 also is answered in the negative. Consequently, the routine cycles through the loop formed of instruction 92 and inquiries 94 and 96.

In the foregoing discussion, it had been assumed that indicia 26 are expected in Zone B. Hence, when inquiry 94 was answered in the affirmative, it was assumed that the detected indicia were the indicia in Zone B. Let it be assumed, however, that Zone B is free of indcia, and this condition is established by, for example, operator-activated switches. Consequently, when inquiry 94 is answered in the affirmative, it is assumed that the detected indicia constitute indicia 28 in Zone C. At this time, then, inquiry 94 is answered in the affirmative, inquiry 98 also is answered in the affirmative, but inquiry 100 now is answered in the negative. The learning routine then advances to instruction 110 to store the pulse count which had been accumulated at the time inquiry 94 is answered in the affirmative as pulse count $C_1$. From FIG. 2, it is seen that, if flag B had been set and if no indicia are present in Zone B, then the next detection of indicia occurs at location $C_1$. Instruction 110 stores the pulse count which represents the beginning of indicia 28 and, thus, which represents the beginning of Zone C (the "endorse space").

After storing pulse count $C_1$, the routine advances to inquiry 112 to determine if indicia still are detected. This inquiry is similar to inquiry 104, and if answered in the affirmative, that is, if indicia within Zone C still are detected, the routine returns to instruction 92. At this time, the loop formed of instruction 92, inquiries 94, 98 and 100, instruction 110 and inquiry 112 is cycled.

When the end of indicia 28 is reached, indicia no longer are detected, and inquiry 112 is answered in the negative. As before, it is assumed that inquiry 112 is answered in the negative before inquiry 94 is similarly answered. It is seen from FIG. 2 that indicia 28 end at location $C_2$, and the pulse count $C_2$ which represents the end of Zone C is stored, as represented by instruction 114. The routine then returns to instruction 92.

When inquiry 94 next is reached, it is answered in the negative. This is because envelope 10 has advanced into Zone D at which indicia are not present and, thus, indicia are not detected. In response to a negative answer to inquiry 94, inquiry 96 is reached. Since the trailing edge of the envelope has not yet been sensed, inquiry 96 also is answered in the negative. Accordingly, the routine cycles through the loop formed of instruction 92 and inquiries 94 and 96 until trailing edge 32 is detected. At that time, inquiry 96 is answered in the affirmative, the pulse count present at the time the trailing edge is reached is stored as pulse count D (instruction 116) and all flags (particularly flag B) are cleared, as represented by instruction 118.

At this time, counts $B_1$ and $B_2$ in Zone B, which represent the particular location of indicia 26, as well as counts $C_1$ and $C_2$, which define Zone C and which represent the confines of indicia 28, as well as pulse count D which represents the location of the trailing edge of envelope 10, are stored. The illustrated learning routine then is repeated for the next sample.

Let it be assumed that indicia are expected in Zones B and C, and indicia 26 in Zone B had been detected. From inquiry 100, instruction 102, inquiry 104 and instructions 106 and 108, pulse counts $B_1$ and $B_2$ are stored, endorse flag C is set and reserve flag B is cleared. In the space between pulse count $B_2$ and pulse count $C_1$, indicia are not detected. Hence, as this portion of envelope 10 passes beneath photoelectric detector 24, inquiry 94 as well as inquiry 96 are answered in the negative. The next time that indicia are sensed, which is seen to correspond to the beginning of indicia 28, inquiry 94 is answered in the affirmative. At this time, however, since flag B had been cleared, inquiry 98 is answered in the negative. Accordingly, the learning routine advances to inquiry 101.

Since flag C had been set by instruction 108, inquiry 104, which determines if the endorse flag C is set, is answered in the affirmative. The pulse count which had been reached at this time, that is, pulse count $C_1$, is stored, as represented by instruction 110. Then, for as long as indicia continue to be detected, the encoder pulses merely are counted and the learning routine cycles through the loop formed of instruction 92, inquiries 94, 98 and 101, instruction 110 and inquiry 112. When indicia no longer are detected, as at the end of indicia 28, inquiry 112 is answered in the negative and the pulse count which has been accumulated is stored as pulse count $C_2$.

Thus, pulse counts $B_1$, $B_2$, $C_1$ and $C_2$ are stored to represent the locations of indicia in Zones B and C. When trailing edge 32 is detected, inquiry 96 is answered in the affirmative and pulse count D is stored to represent the location of the trailing edge of the envelope. If the encoder pulse counter had been reset at the time that leading edge 30 had been detected, then pulse count D represents the length (in terms of encoder pulses) of the sample envelope. In addition, the following may be calculated easily from stored pulse counts $B_1$, $B_2$, $C_1$, $C_2$ and D:

The length of Zone B is determined by pulse count $C_1$.

The length of Zone C is determined by the difference between pulse counts $C_2$ and $C_1$.

The length of Zone D is determined by the difference between pulse counts D and $C_2$.

Thus, the pre-established conditions of the length of the respective zones, the presence or absence of indicia in each zone and the length of each group of indicia are determined and may be stored for use during the verifying mode to verify that indicia are correctly provided at proper locations on envelopes.

The foregoing explanation has assumed that indicia are present in Zone C. Let it now be assumed that, although indicia are present in Zone B, the sample which is scanned by the apparatus illustrated in FIG. 1 is provided with no indicia in Zone C. With these assumptions, when the sample has advanced to location $B_2$, indicia no longer are detected and inquiry 104 is answered in the negative. Then, pulse count $B_2$ is stored (pulse count $B_1$ had been stored previously), as represented by instruction 106, flag C is set and flag B is cleared, as represented by instruction 108. The learning routine then cycles through the loop formed of instruction 92 and inquiries 94 and 96.

Eventually, in the absence of detecting further indicia, trailing edge 32 is detected and inquiry 96 is answered in the affirmative. Then, pulse count D, representing the location of the trailing edge, is stored (instruction 116) and those flags which had been set (i. e. flag C) are cleared, as represented by instruction 118.

In the just-described example, pulse counts B $B_2$ and D are stored. Pulse counts $C_1$ and $C_2$ are not stored because indicia are not detected in Zone C.

Let it be assumed that three samples are scanned during the learning mode of the present invention. Let it be further assumed that the following pulse counts are stored:

| Sample | Count $B_1$ | Count $B_2$ | Count $C_1$ | Count $C_2$ | Count D |
|---|---|---|---|---|---|
| 1 | 100 | 250 | 295 | 405 | 498 |
| 2 | 101 | 250 | 294 | 404 | 498 |
| 3 | 99 | 251 | 295 | 407 | 499 |

After the last sample had been scanned, inquiry 84 is answered in the affirmative, and instruction 86 sets tolerances for the stored counts. In this example, the counts to which an actual envelope will be compared during the verifying mode are as follows: count $B_1=97$; count $B_2=253$; count $C_1=292$; count $C_2=409$; count $D=501$. Thus, if indicia are found in Zone B at an interval ranging from a pulse count of 97 to a pulse count of 253, the presence of indicia 26 is confirmed. That is, inquiry 54 (FIG. 4) is answered in the affirmative. Likewise, if indicia are found in Zone C in an interval ranging from a pulse count of 292 to a pulse count of 409, the presence of indicia 28 is confirmed. That is, inquiry 64 (FIG. 4) is answered in the affirmative. Finally, if a trailing edge is detected by the time the pulse count increments to a count of 501, the detection of the trailing edge is confirmed and inquiry 72 (FIG. 4) is answered in the affirmative.

While the present invention has been particularly shown and described with reference to a preferred embodiment, it will be readily appreciated that various changes and modifications may be made without departing from the spirit and scope of the invention. Some of these changes and modifications have been suggested above. Of course, it is recognized that this invention is not limited in use solely to verify the presence of indicia at particular zones on envelopes. Rather, a broader application of this invention contemplates detecting indicia on various different types of objects. It is intended, therefore, that the claims be interpreted so as to cover not only the specific embodiment and examples described, but other equivalents thereto.

What is claimed is:

1. A system for establishing parameters for use in a verifying the selective presence of indicia in one or more respective zones of an object, said system comprising:

detecting means for detecting at least a leading edge and a trailing edge of an object;

sensing means for sensing the presence of indicia on an object;

motion means for imparting relative movement between the object and at least the detecting means;

measuring means for measuring the interval between the detected leading edge of the object and the beginning of indicia on the object and for measuring the interval over which said indicia are present, thereby determining a zone in which indicia are expected; and means responsive to said detecting means and said sensing means for measuring the interval between the sensed end of indicia on the object and the detected trailing edge, thereby determining another zone in which indicia are not expected.

2. The system of claim 1 further comprising means responsive to said sensing means and to said measuring means for determining a zone from the leading edge of the object to the beginning of indicia on the object in which indicia are not expected.

3. The system of claim 1 wherein said sensing means senses first and second sets of indicia on said object; and wherein said measuring means is responsive to said detecting means and to said sensing means for measuring a first interval over which the first set of indicia are present and for measuring a second interval over which the second set of indicia are present, thereby determining first and second zones in which indicia are expected.

4. The system of claim 1 wherein said measuring means includes pulse generating means for generating pulses as relative movement is imparted to the object and the detecting and sensing means, pulse counting means for counting said pulses, and means for storing the pulse counts at least when the beginning and end of indicia are sensed.

5. The system of claim 4 wherein the sensing means comprises an optical sensor for producing an output signal whose level varies with changes in light intensity sensed thereby; and means for detecting if a time-average of the output signal level exceeds a predetermined threshold.

6. The system of claim 1 wherein the object comprises an envelope and the indicia comprise print indicia printed at one or more discrete locations on said envelope.

7. A system for verifying whether indicia are correctly provided on an object, comprising:
   means for detecting the presence of the object by detecting a leading edge of the object;
   means for providing relative movement between the object and the object-detecting means;
   means for determining the location on the object of a zone whereat indicia are expected, said location-determining means comprising means for detecting a trailing edge of the object, means for generating pulses as relative movement between the object and the detectors occur;
   means for counting the generated pulses;
   means for determining when a predetermined number of pulses have been counted prior to detecting a trailing edge of the object; and
   means for indicating an error if said predetermined number of pulses have been counter prior to detecting a trailing edge of the object.

8. The system of claim 7 wherein the object comprises an envelope and the indicia comprise print indicia printed at one or more discrete locations on said envelope.

9. The system of claim 7 wherein said zone determining means comprises pulse generating means for generating pulses as relative movement between the object and the detecting and sensing means is provided; pulse counting means for counting the pulses; and means for detecting when the pulse count reaches at least one predetermined value.

10. The system of claim 9 further comprising means for verifying the selected presence of indicia in said at least one predetermined zone.comprising means responsive to said sensing means and to said means for detecting when the pulse count reaches at least one predetermined value to determine if indicia have been sensed as being present on the object during the interval that the pulse count changes from a first count to a second count.

11. The system of claim 10 further comprising error indicating means for indicating an error if indicia are sensed as being present on the object during the interval that the pulse count changes from a first count to a second count.

12. The system of claim 10 further comprising error indicating means for indicating an error if indicia are not sensed as being present on the object during the interval that the pulse count changes from a first count to a second count.

13. The system of claim 10 wherein said means for verifying the selected presence of indicia in said at least one predetermined zone further comprises means to determine if indicia have been sensed as being present on the object during the interval that the pulse count changes from said second count to a third count.

14. The system of claim 13 further comprising error indicating means for indicating an error if indicia are not sensed as being present on the object during the interval that the pulse count changes from said second count to said third count.

15. The system of claim 13 further comprising error indicating means for indicating an error if indicia are sensed as being present on the object during the interval that the pulse count changes from said second count to said third count.

16. The system of claim 13 wherein said means for verifying the selected presence of indicia in said at least one predetermined zone further comprises means to determine if indicia have been sensed as being present on the object during the interval that the pulse count changes from said third count to a fourth count 17. The system of claim 16 further comprising error indicating means for indicating an error if indicia are sensed as being present on the object during the interval that the pulse count changes from said third count to said fourth count.

18. A method of determining the size of respective ones on an object and whether indicia are provided in the respective zones, comprising the steps of:
   (a) providing relative movement between a sample of the object containing the indicia in the respective zones and indicia
   (b) detecting a leading edge of said object;
   (c) sensing the presence of indicia on said object;
   (d) determining the distance from said leading edge to the location of the indicia on said object;
   (e) sensing the end of indicia on said object;
   (f) determining the distance over which said indicia extend to establish an indicia zone;
   (g) storing information indicating the location of the beginning and the end of said indicia zone on the sample;
   (h) thereafter processing other objects by carrying out steps (a) and (b) and sensing the presence of indicia on said other objects determined by the stored information of step (g);
   (i) and using the sensed information obtained in step (h) to verify whether the indicia are correctly located in a corresponding zone of the object.

19. The method of claim 18 wherein each step of determining distance comprises generating pulses as relative movement between the object and the indicia sensing means is provided; counting said pulses; and storing the pulse count when indicia are sensed, when the end of indicia is sensed or.

20. The method of claim 19 further comprising the step of determining the distance from the end of indicia on said object to the trailing edge of said object.

21. The method of claim 20 further comprising the steps of sensing a second presence of indicia on said object; determining the distance from the end of the first-sensed indicia to the location of the second presence of indicia; sensing the end of the second presence of indicia; and determining the distance over which the second presence of indicia extend.

22. The method of claim 21 wherein each step of determining distance comprises generating pulses as relative movement between the object and the indicia sensing means is provided; counting said pulses; and storing the pulse count when indicia are sensed, when the end of indicia is sensed or when the trailing edge is detected, respectively.

23. The method of claim Il further comprising the step of establishing tolerances for each stored pulse count by subtracting pulses from the pulse count representing the beginning of indicia and adding pulses to the pulse count representing the end of the same indicia and storing these new pulse counts in place of the original stored pulse count, and using these new pulse counts in carrying out steps (h) and (i) in place of the stored information of step (g).

24. A method of verifying whether indicia are correctly provided on an object, comprising the steps of:
providing relative movement between the object and a sensor;
detecting the presence of the object by detecting a leading edge of the object;
determining the location on the object whereat indicia are expected by detecting a trailing edge of the object; generating pulses as relative movement between the object and the sensor is provided, counting the generated pulses, determining if a predetermined number of pulses have been counted prior to detecting a trailing edge of the object; and
indicating an error if said predetermined number of pulses have been counted prior to detecting a trailing edge of the object.

25. A system for determining the size of respective zones on an object and whether indicia are provided in the respective zones, comprising:
(a) means for detecting a leading edge of said object;
(b) means for sensing the presence of indicia on said object;
(c) means for providing relative movement between a sample of the object containing the indicia in the respective zones and the indicia-sensing means;
(d) means for determining the distance from said leading edge to the location of the indicia on said object;
(e) means for sensing the end of indicia on said object;
(f) means for determining the distance over which said indicia extend to determine an indicia-containing zone;
(g) means for storing information indicating the location of the beginning and the end of said zone for said indicia on the sample;
(h) and means for using the stored information with other objects to verify whether the indicia are correctly located in a corresponding zone of the object objects.

26. The system of claim 25 wherein means are provided for incrementing a pulse count representing the end of indicia and for decrementing the pulse count representing the beginning of indicia.

27. A system for verifying whether indicia are correctly provided on an object, comprising:
means for detecting the presence of the object by detecting a leading edge of the object;
means for providing relative movement between the object and the object-detecting means;
means for determining the location on the object whereat indicia are expected, said indicia including plural items with spaces between, said location-determining means comprising means for sensing whether indicia are present by optically scanning the determined location on said object and for producing a signal whose level changes as a function of scanned indicia items and scanned spaces, means for time-averaging the changes in the signal level, and means for comparing the time-averaged changes against a given threshold level.

28. A method of verifying whether indicia are correctly provided on an object, comprising the steps of:
providing relative movement between the object and a sensor;
detecting the presence of the object by detecting a leading edge of the object;
determining the location on the object whereat indicia are expected, said indicia including plural items with spaces in between;
and sensing whether indicia are present by optically scanning the determined location on said object to produce a signal whose level changes as a function of scanned indicia items and scanned spaces; detecting the time average changes in the signal level; and determining that indicia are present when the detected time average changes exceed a given threshold level.

29. The method of claim 28 wherein the presence of the object is detected by detecting a leading edge of the object.

30. The method of claim 29 wherein the step of determining the location on the object whereat indicia are expected comprises generating pulses as relative movement between the object and the sensor is provided; and determining when a number of pulses corresponding to said location have been generated.

31. The method of claim 30 wherein the step of determining when a number of pulses corresponding to said location have been generated comprises counting said pulses and determining when a predetermined count has been reached.

* * * * *